May 21, 1935.  L. KLINKERT  2,002,148
METHOD OF MAKING GRID ELECTRODES
Filed March 19, 1934
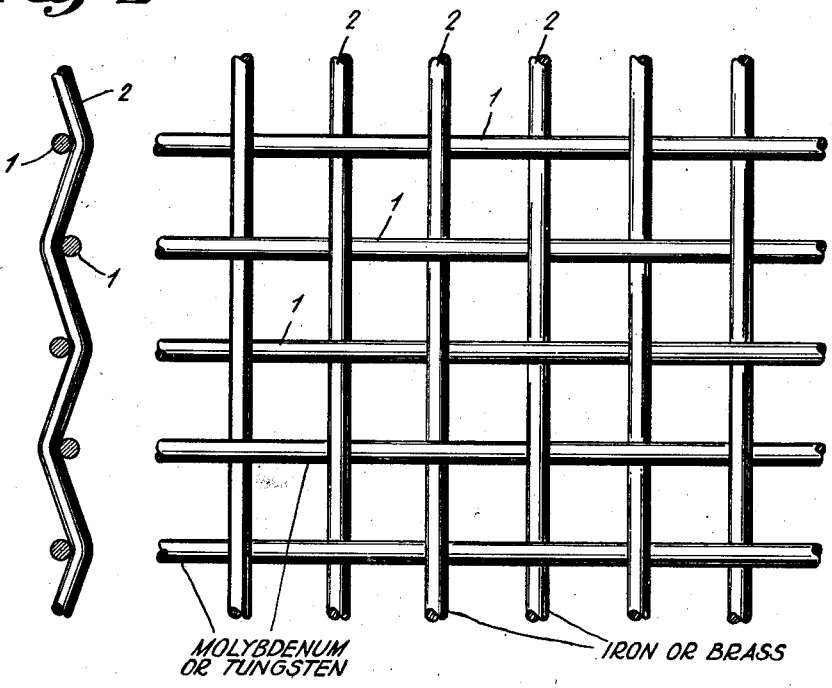
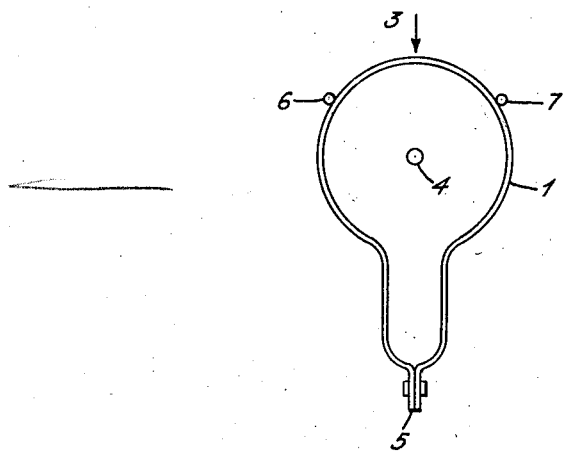
INVENTOR
LEONARD KLINKERT
BY
ATTORNEY Patented May 21, 1935

2,002,148

UNITED STATES PATENT OFFICE 2,002,148

METHOD OF MAKING GRID ELECTRODES

Leonard Klinkert, Eindhoven, Netherlands, assignor to Radio Corporation of America, a corporation of Delaware Application March 19, 1934, Serial No. 716,367
In the Netherlands March 22, 1933

3 Claims. (Cl. 140—71)

The invention relates to a method of manufacturing wire bodies, such as for example, grid-shaped electrodes or screens for electric discharge tubes or incandescent lamps.

It is generally desired that these bodies should be constructed in a determined manner, that is to say that the wires of which said bodies are composed should occupy a determined position relatively to one another, which position will not be changed or modified during manufacture to an appreciable degree. A known method of manufacturing such bodies consists in winding a wire on one or more supports or on a former or mandrel which is subsequently removed. For many purposes, however, it is then still necessary to give the wire body a determined shape; it will be evident that more particularly when working with extremely thin wires as frequently occurs with electric discharge tubes, a displacement of these wires relatively to one another may take place due to which it is not impossible that these bodies become unfit for the purpose for which they are destined.

The invention has for its object to remove these drawbacks and to provide a method whereby it is possible to manufacture wire bodies with which during manufacture, for example, when these bodies are being bent, the wires are not shifted relatively to one another, so that they may be spaced apart from one another by a definite distance which may be determined beforehand and which during the preliminary treatment is not or substantially not subject to any change. In the method according to the invention wire bodies for electric discharge tubes or incandescent lamps are formed of a wire gauze or network in which the wires consist of different materials; said wire gauze or network is given the shape desired and subsequently some of the wires are removed by chemical agency.

A simple mode of realization of this method consists in making part of the wire gauze of a chemically stable material, for example a material which is insoluble in determined inorganic acids.

This method allows the manufacture of wire bodies which during their manufacture are substantially not subject to deformation. By uniting the wires of these bodies with other wires so as to produce a wire gauze or network it is possible to obtain a mechanically rigid body which may be bent into any suitable shape without the wires of the manufactured body being shifted relatively to one another. In order to still further increase the rigidity and immovability of the wires of the manufactured body, it has proved to be advantageous to roll the wire gauze after its manufacture owing to which some of the wires may slightly penetrate into the surface of the other wires so that the latter wires are kept immovably in their places.

For the sake of a greater rigidity during manufacture it has previously been proposed to wind helical bodies, for example, heating wires for electric incandescent lamps on a core which is subsequently removed from the helix. In this case, however, it was not excluded that in bending such bodies the turns of the helix were displaced over the surface of the core wire so that a determined distance between these turns could not be maintained. This inconvenience cannot occur in the present invention owing to the fact that the wires are united with one another to form a closely interwoven network or sheet of gauze in such manner that displacement is practically no longer possible.

The method according to the invention may be applied with great advantage to the manufacture of wire grids for electric discharge tubes. The applicant has found that the electrodes may be manufactured in a very simple and efficient manner by uniting the operative portion of the grid, which portion consists of chemically stable material, such as tungsten or molybdenum, with wires consisting of a material soluble in inorganic acids, such as iron or brass, so as to produce a closely interwoven network or sheet of gauze. After the grid has been given the shape desired, the iron wires may be removed by chemical means. Thus it is possible to manufacture, for example, a grid of uniform pitch by interweaving the grid wires with iron wires so as to form a sheet of gauze, said iron wires being subsequently removed by dissolving them for example in muriatic acid. A very rigid structure may then be obtained in this case by rolling the wire gauze prior to giving it the shape desired, owing to which the harder wires for example of molybdenum or tungsten are pressed into the softer wires, for example of iron or brass, with the result that the grid wires which are to form the finished electrode are immovably kept in fixed and uniformly spaced relation. Thus it is possible also to manufacture grids having an irregular pitch, or grids comprising fixing wires by alternating the grid parts formed by molybdenum or tungsten wire at some points with iron wires.

The invention may be applied more particularly to grids formed of very thin wires because with such grids the possibility of a mutual displacement of the wires is very great.

The invention will be explained more fully with reference to a mode of realization given by way of example and to the accompanying drawing which represents a determined form of construction obtained in accordance with the present invention.

Figs. 1 and 2 show on an enlarged scale front and side views of a portion of the electrode material in the initial stage, and Fig. 3 shows a plan view of the finished electrode.

For the manufacture, for example, of a grid for electric discharge tubes one starts with a sheet of gauze consisting of molybdenum or tungsten wires (1 in Figures 1 and 2) which are closely interwoven with iron wires 2 so as to form a sheet of gauze. In the present case the molybdenum wires may have a thickness of 100μ, the thickness of the iron wires being preferably of the same order of magnitude. After these wires have been united with one another so as to form a sheet of gauze, the electrode may be given the shape desired, for example, that shown in Figure 3. The grid, which may be utilized as a screening grid in an electric discharge tube, consists in this case of the part 3 proper which surrounds a cathode 4 and which has a somewhat particular shape, said part 3 being furnished with a part 5 acting as a cooling wing. With the aid of the method according to the invention it is possible to give the grid wires 1 of tungsten or molybdenum such a particular shape without being shifted relatively to one another to any appreciable degree. When the grid has taken this shape it is only necessary to dip the body consisting as yet of a sheet of gauze into a solution of muriatic acid owing to which the iron wires may be chemically removed. The finished electrode will then comprise the grid wires 1 and their supports 6 and 7 which may also be of tungsten or molybdenum.

It will be evident that the invention need not be limited to the above described example but that many other modes of realization with determined wire materials and chemical solvents in various combinations are possible.

What I claim is:

1. The method of making grid-like electrodes for thermionic tubes which consists in winding a series of substantially parallel suitably spaced grid wires about a plurality of vertical support rods, interweaving said grid wires with a plurality of wires arranged in parallel relation to the support rods in order to maintain the grid wires in fixed spaced relation during manufacture, and then removing said spacing wires by chemical means.

2. The method of making grid electrodes for electron discharge devices which consists in interweaving a series of parallel grid wires of one kind of material with another series of wires of another kind of material arranged perpendicularly to the first series, shaping the interwoven wires to a desired form, and then removing the second series of wires by chemical action.

3. The method of making grid electrodes for electron discharge devices which consists in interweaving a series of substantially parallel grid wires of one kind of material with a series of substantially parallel spacing wires of another kind of material arranged substantially perpendicularly to the first series, shaping the wires so interwoven to substantially a cylindrical form, and then removing the series of spacing wires by chemical action.

LEONARD KLINKERT.